United States Patent [19]

Imhof et al.

[11] Patent Number: 5,163,974
[45] Date of Patent: Nov. 17, 1992

[54] PROCESS FOR MANUFACTURING FIBER STRUCTURE PLATES FOR POSITIVE AND NEGATIVE ELECTRODES

[75] Inventors: Otwin Imhof, Nürtingen; Holger Kistrup, Esslingen; Claus Schneider, Fellbach; Friedrich Haschka, Esslingen, all of Fed. Rep. of Germany

[73] Assignee: Deutsche Automobilgesellschaft mbH, Fed. Rep. of Germany

[21] Appl. No.: 712,874

[22] Filed: Jun. 7, 1991

[30] Foreign Application Priority Data

Jun. 9, 1990 [DE] Fed. Rep. of Germany ....... 4018486

[51] Int. Cl.$^5$ ............................................. H01M 6/00
[52] U.S. Cl. .................................................. 29/623.5
[58] Field of Search ...................... 29/623.5, 2; 419/2, 419/24, 4; 141/1.1; 429/235, 236, 209

[56] References Cited

U.S. PATENT DOCUMENTS

| | | | |
|---|---|---|---|
| 745,274 | 11/1903 | Buhne | 429/237 |
| 2,640,865 | 6/1953 | Brennan | 429/163 |
| 3,053,925 | 9/1962 | Donohue | 429/237 |
| 3,055,963 | 9/1962 | Krebs | 429/237 X |
| 3,262,815 | 7/1966 | Langer et al. | 429/235 X |
| 3,835,514 | 9/1974 | Pollack | 29/2 |
| 4,623,600 | 11/1986 | Fritts | 429/235 X |

FOREIGN PATENT DOCUMENTS

| | | |
|---|---|---|
| 1063233 | 8/1959 | Fed. Rep. of Germany . |
| 1596240 | 4/1971 | Fed. Rep. of Germany . |
| 1922953 | 6/1971 | Fed. Rep. of Germany . |
| 3005724 | 12/1983 | Fed. Rep. of Germany . |
| 3337751 | 2/1985 | Fed. Rep. of Germany . |
| 3822197 | 8/1989 | Fed. Rep. of Germany . |

*Primary Examiner*—Anthony Skapars
*Attorney, Agent, or Firm*—Evenson, Wands, Edwards, Lenahan & McKeown

[57] ABSTRACT

A process manufacturing positive and negative fiber structure electrodes for open as well as gastight electrochemical current sources, particularly nickel-cadmium accumulators. After the filling of the calibrated plate with an active mass and the subsequent drying of the plate filled with a moist a mass, the plate is calibrated again by means of calibrating presses or calibrating rollers. The calibrating plates or rollers are cleaned to remove adhering or deposited active mass or other dirt by means of ductors or rotating brush rollers while being at the same time subjected to suction. Thus electrodes are created which have plane surfaces for cells for the highest standards with respect to the individual active components and the mounted stack in the given dimensions.

17 Claims, No Drawings

PROCESS FOR MANUFACTURING FIBER STRUCTURE PLATES FOR POSITIVE AND NEGATIVE ELECTRODES

BACKGROUND AND SUMMARY OF THE INVENTION

The present invention relates to a process for manufacturing fiber structure electrode plates for use in positive and negative electrodes of electrochemical current accumulator sources, particularly in open or closed, gastight nickel cadmium accumulators.

In the manufacturing of cells of a prismatic shape, when fiber structure electrodes are used, because of excessive variations in the individual manufacturing steps, among other things, in the thickness of the individual components (principally of the positive and negative electrodes), after the mounting of the plate stack and the installation of the plate stack with the separators and the recombining devices, the cell housing will be so thick that several cells of this type cannot be installed into an existing steel receptacle, such as a battery tray. The excessive tolerances in the manufacturing of electrodes have additional disadvantages during the construction and operation of cells with parts produced in this manner; these include, for example: that the laid-out electrolyte quantity corresponding to the volume of the planned housing is not coordinated with the volume of the actual expanded housing; that the actual porosities and hollow-space distributions in the real cell do not correspond to the theoretical and calculated values; that shifts occur in the amount of the dischargeable capacity and energy for various load conditions; that lower Ah and Wh yields result; that a changed inside pressure of the cell occurs (usually connected with a decreased lifetime of the cell); that, because of the undefined electrode geometry, no uniform electrode gap is ensured; that a non-uniform distribution of the amount and concentration of the electrolyte occurs; that the pressure conditions affecting the installed separators differ and therefore a uniform electrolyte storage (intake capacity) is disturbed; or that an imbalance builds up of the part of the charge and discharge reserve of the negative electrode, so that the negative electrode is larger than the positive electrode.

Variations in the manufacturing process occur, among other things, due to the unbending of a plate during filling, insufficient removal of the excess paste from the surface of the electrode after the pasting, or an oozing-out of paste before the drying. If such variations are not eliminated prior to assembly, a high failure rate of the cells occurs due to short circuits, which are usually caused at only a few locally occurring points in the plate stack, and often do not break through until after the operation of several cycles of the cell.

In this respect, it is known, for example, from the German Patent Document DE-AS 11 08 759, that a non-metallized foamed-material structure plate with a diverting system which is to be installed separately is to be used in a process for manufacturing electrodes for accumulators, particularly for lead accumulators.

German Patent Document DE-AS 10 63 233 discloses an electrode for alkaline accumulators in which the carrier of the active mass consists of metal filaments which are sintered together with one another or of similar structures, as well as a process and apparatus for manufacturing such carrier. However, as is disclosed in this text, the pressing-together of electrodes of this type, after the activation to increase the conductivity and capacity, is possible only with limitations, or is hardly possible without the risk that the junction points which are welded together with one another tear apart. As a result the cohesion of the sintered structure is endangered.

German Patent Document DE-AS 15 96 240, discloses an electric accumulator in which the carriers of the electrodes consist of a fabric or felt as the fiber material, and the ductile electrodes are compressed in the accumulator case. For this purpose, the carrier is subjected to a compression after depositing of the active mass (see Column 7, Line 30 et seq.). This text contains no information, however, on the process conditions of the suggested compression, or on how many process steps are required for this purpose.

German Patent Document DE-PS 30 05 725 relates to a foam structure electrode with a sponge-type deposit of a nickel metal matrix, for galvanic elements. However, in the case of sponge-type structures (and metallic sponge-type structures, as well), after the pressing-together, there is generally a considerable memory effect with respect to the shape, so that they resume their original shape when the outside pressure is eliminated.

In addition, a Publication of the 16th International Power Sources Symposium 1988, Page 1 et seq., discloses sponge-type nickel electrodes to which the above-mentioned criticism also applies.

It is therefore an object of the invention to provide a process for manufacturing dried fiber structure electrodes, which are filled with an active mass, and for manufacturing their coating, in which the above-mentioned disadvantages, such as excessive variations in thickness, and the resulting non-uniform pressure and distribution conditions (electrolyte) and an unfavorable installation of the premounted plate sets into the cell housing, are eliminated or at least reduced. It is also an object of the invention, to provide a process by which the fiber structure electrode plates can be manufactured efficiently and with precise measurements for high standards. It is also an object of the invention to provide cells of a prismatic shape which do not lose their required characteristics prematurely due among other things to soft short circuits.

BRIEF DESCRIPTION OF THE INVENTION

According to the invention, a fiber structure electrode plate which has previously been calibrated (pressed to a desired thickness over the whole surface thereof) is filled with an active mass and is dried. Thereafter, it is again calibrated, by means of a calibration press having two pressing plates which may be adjusted so that their separation at bottom of dead center results in desired thickness for the filled and dried electrode, depending on the intended application. Advantageously, the dwell time of calibrating press with the pressing plates at bottom of dead center is at least 0.1 second. This second calibration process may be carried out at a temperature which ranges from room temperature (20° C.) to a maximum of 250° C. In lieu of a calibration press, it may also be performed by calibration rollers or the like, in a known manner.

After removal of the calibrated electrode from the calibration press and, before insertion of the next electrode to be calibrated, the calibrating plates are either stripped by means of a lip or are cleaned by means of rotating roller brushes while simultaneously being subjected to suction.

The first calibration of the fiber electrode plate has the purpose of establishing the dimensions of the filling volume of the electrode which is to be impregnated with the active mass paste so that, if possible, they can be reproduced for a manufacturing process. After the first calibrating step has taken place, according to the invention, the plate is impregnated with the active mass paste and is then calibrated a second time. One reason, among others, why such a shaping step was found useful in the production sequence is that, in the second calibrating step the metallized or unmetallized fibers which protrude to the plane of the electrode surface, due to brushing during vibration filling or due to vibration itself, are resettled from the respective uppermost web layer of the electrode plate, and therefore cannot subsequently cause premature short circuits, for example, as a result of a piercing of the separator. Another advantage of this procedure is that, particularly in the case of low metal coatings (mg metal/cm$^2$ felt surface) and thin felt types (smaller than 1 mm nominal thickness), in the course of the vibration filling, a partial spring-back of the plate may take place, and the second calibration effectively reverses the resulting interfering volume changes, which furthers the interest of a precise fit, mainly in the case of highly loadable cells with narrowly calculated cell dimensions.

DETAILED DESCRIPTION OF THE INVENTION

The process according to the invention will now be explained in detail by means of examples:

EXAMPLE 1

FOR COMPARISON

A positive electrode with a nickel-plated plate (150 mg Ni/cm$^2$; cross-sectional surface 110 mm times 120 mm), calibrated before the impregnation to 1.5 mm, after the impregnation has a filling of 21.2 g of active dry mass. This corresponds to approximately 0.159 g of a dry filling per cm$^2$ or 1.065 g of a dry filling per cm$^3$ or approximately 0.31 Ah/cm$^3$.

EXAMPLE 2

A positive electrode as in Example 1, after the impregnation calibrated to 1.2 mm, has a dry filling of 21.2 g of an active mass; that is 0.159 g/cm$^2$ or 1.325 g/cm$^3$ or approximately 0.38 Ah/cm$^3$. In comparison to Example 1, that is an increase of 0.07 Ah/cm$^3$. In addition, the electrode is thinner now, so that more sets of plates can be housed in the same cell housing.

EXAMPLE 3

FOR COMPARISON

An electrode with a current transporting tab, which was calibrated to a thickness of 1.3 mm before the impregnation, was filled and dried. Then, by means of an indicating caliper, the thickness profile was measured at 14 points distributed over the surface of the elctrode. In particular, these points were located at 10 mm intervals along the periphery of the electrode 5 mm away from the edge, in the center of the electrode, and along its diagonals. This resulted in the following measured values: 1.45 mm, 1.44 mm, 1.439 mm, 1.444 mm, 1.418 mm, 1.472 mm, 1.435 mm, 1.509 mm, 1.443 mm, 1.468 mm, 1.515 mm, 1.432 mm, 1.522 mm, and 1.456 mm.

EXAMPLE 4

An electrode calibrated to a thickness of 1.3 mm was filled (uniform increase of active mass), dried and then again calibrated to a thickness of 1.3 mm and its thickness profile was measured by means of an indicating caliper, as described in Example 3. The following measured values were obtained (each distance 10 mm): 1.31 mm, 1.322 mm, 1.325 mm, 1.314 mm, 1.325 mm, 1.338 mm, 1.316 mm, 1.308 mm, 1.295 mm, 1.292 mm, 1.305 mm, 1.310 mm, 1.323 mm, and 1.316 mm.

EXAMPLE 5

FOR COMPARISON

A stack of plates consisting of 8 positive electrodes (calibrated to 1.3 mm before the impregnation), 16 negative electrodes (calibrated to 0.75 mm before the impregnation) and 9 recombining plates (calibrated to 0.6 mm respectively) as well as 16 separators, after the impregnation and the drying of the electrodes and the assembly, results in a stack thickness of 37.05 mm. The main increase in thickness is caused by the electrodes themselves which, on the one hand, in the case of the filling, essentially tend to regain a part of the previously calibrated decrease in thickness, and which, on the other hand, is created by paste residue remaining on the surface as a dried-on film or as dried on thickenings.

EXAMPLE 6

A stack of plates as described in Example 5 in which, however, the individual electrodes were calibrated again after the impregnation (in each case, the same thickness is indicated as before the impregnation), after the assembly has a thickness of 32.96 mm.

The principal advantages of the invention are that the cells which, after calibration, filling with an active mass and drying, are calibrated again, when treated appropriately, have a much longer useful life than electrochemical sources of current. It is also an advantage of the invention that, by means of the calibration of the electrodes after the impregnation and drying, cells can be manufactured which have precise measurements. In addition, by means of the invention, cells can advantageously be produced which have a higher energy, while the dimensions of the housing are the same. In practice it has been found to be advantageous to establish a ratio of the filled dried electrode to the filled, dried and calibrated electrode of approximately 1.5 for gastight cells and 1.6 for open cells.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for manufacturing fiber structure electrodes for use as a positive and a negative electrode of electrochemical current accumulator sources, comprising the steps of:
   providing a fiber structure electrode plate;
   calibrating said fiber structure electrode plate;
   filling said fiber structure electrode plate with an active mass;
   drying the fiber structure electrode plate; and
   calibrating said fiber structure electrode plate a second time.

2. Process for manufacturing fiber structure electrodes according to claim 1, wherein said electrochemical current accumulator sources are nickel cadmium accumulators of a type which is one of: open or closed.

3. Process for manufacturing fiber structure electrodes according to claim 1, wherein said calibrating step which follows the said drying step is performed at a temperature of the calibrating tool which ranges between room temperature and 250° C.

4. Process for manufacturing fiber structure electrodes according to claim 1, wherein during the calibrating step which follows the drying step, the dwell time of the calibrating tool in the bottom dead center is at least 0.1 s.

5. Process for manufacturing fiber structure electrodes according to claim 3, wherein during the calibrating step which follows the drying step, the dwell time of the calibrating tool in the bottom dead center is at least 0.1 s.

6. A process for manufacturing fiber structure electrodes according to claim 1, wherein during the calibrating step which follows the drying step, a ratio of the thickness of the filled dried electrode to the thickness of the filled, dried and calibrated electrode is established at 1.6, when used for open cells, and at 1.5 when used for gastight cells.

7. A process for manufacturing of fiber structure electrodes according to claim 3, wherein during the calibrating step which follows the drying step, a ratio of the thickness of the filled dried electrode to the thickness of the filled, dried and calibrated electrode is established at 1.6, when used for open cells, and at 1.5 when used for gastight cells.

8. A process for manufacturing fiber structure electrodes according to claim 4, wherein during the calibrating step which follows the drying step, a ratio of the thickness of the filled dried electrode to the thickness of the filled, dried and calibrated electrode is established at 1.6, when used for open cells, and at 1.5 when used for gastight cells.

9. A process for manufacturing fiber structure electrodes according to claim 1, wherein said step of calibrating which follows said drying step is performed by means of calibrating tool having an upper press plate and a lower press plate which are cleaned after each calibration to remove adhering or crumbled material.

10. A process for manufacturing fiber structure electrodes according to claim 3, wherein said step of calibrating which follows said drying step is performed by means of calibrating tool having an upper press plate and a lower press plate which are cleaned after each calibration to remove adhering or crumbled material.

11. A process for manufacturing fiber structure electrodes according to claim 4, wherein said step of calibrating which follows said drying step is performed by means of calibrating tool having an upper press plate and a lower press plate which are cleaned after each calibration to remove adhering or crumbled material.

12. A process for manufacturing fiber structure electrodes according to claim 6, wherein said step of calibrating which follows said drying step is performed by means of calibrating tool having an upper press plate and a lower press plate which are cleaned after each calibration to remove adhering or crumbled material.

13. A process for manufacturing fiber structure electrodes according to claim 1, wherein said step of calibrating which follows said drying step is performed by means of a calibrating tool having upper and lower press plates which are cleaned after each calibration by means of one of: lip stripping and rotating brush rollers, while dust is sucked off simultaneously.

14. A process for manufacturing fiber structure electrodes according to claim 3, wherein said step of calibrating which follows said drying step is performed by means of a calibrating tool having upper and lower press plates which are cleaned after each calibration by means of one of lip stripping and rotating brush rollers, while dust is sucked off simultaneously.

15. A process for manufacturing fiber structure electrodes according to claim 4, wherein said step of calibrating which follows said drying step is performed by means of a calibrating tool having upper and lower press plates which are cleaned after each calibration by means of one of lip stripping and rotating brush rollers, while dust is sucked off simultaneously.

16. A process for manufacturing fiber structure electrodes according to claim 6, wherein said step of calibrating which follows said drying step is performed by means of a calibrating tool having upper and lower press plates which are cleaned after each calibration by means of one of lip stripping and rotating brush rollers, while dust is sucked off simultaneously.

17. A process for manufacturing fiber structure electrodes according to claim 9, wherein said step of calibrating which follows said drying step is performed by means of a calibrating tool having upper and lower press plates which are cleaned after each calibration by means of one of lip stripping and rotating brush rollers, while dust is sucked off simultaneously.

* * * * *